United States Patent [19]

Yatsuzuka

[11] Patent Number: 4,757,517

[45] Date of Patent: Jul. 12, 1988

[54] SYSTEM FOR TRANSMITTING VOICE SIGNAL

[75] Inventor: Yohtaro Yatsuzuka, Tokyo, Japan

[73] Assignee: Kokusai Denshin Denwa Kabushiki Kaisha, Tokyo, Japan

[21] Appl. No.: 31,393

[22] Filed: Mar. 27, 1987

[30] Foreign Application Priority Data

Apr. 4, 1986 [JP] Japan .................................. 61-76788

[51] Int. Cl.[4] .............................................. H04B 14/04

[52] U.S. Cl. ........................................ 375/25; 375/122

[58] Field of Search ...................... 375/25, 38, 122, 27, 375/102; 370/118; 381/29, 31; 358/133, 135

[56] References Cited

U.S. PATENT DOCUMENTS 4,464,783 8/1984 Beraud et al. ........................ 375/122

4,498,173 2/1985 Reudink ................................ 375/38

4,622,680 11/1986 Zinser ................................ 375/122

4,677,671 6/1987 Galand et al. ...................... 375/122

*Primary Examiner*—Benedict V. Safourek

*Assistant Examiner*—Stephen Chin

*Attorney, Agent, or Firm*—Emmanuel J. Lobato; Robert E. Burns

[57] ABSTRACT

A system for transmitting a voice signal is disclosed, in which an input voice signal is predivided into low- and high- frequency residual signals. The low-frequency residual signal is transmitted in the form of waveform codes with higher possible fidelity and lower possible quality deterioration through utilization of the Adaptive Predicture Coding (APC) system or Multi Pulse Excited Coding (MPEC) system, while information on the short-time high-frequency spectrum is extracted from the high-frequency residual signal and is transmitted as information for use in the reproduction of the voice signal on the receiving side.

2 Claims, 10 Drawing Sheets

43

SYSTEM FOR TRANSMITTING VOICE SIGNAL

BACKGROUND OF THE INVENTION

The present invention relates to a voice signal transmitting system, and more particularly to a voice signal transmitting system which is of particular utility when employed in a communication system requiring high utilization efficiency of the transmission path, or a communication system which is subject to severe limitations on the transmission frequency band and transmitting power used.

Heretofore, 64 Kb/s PCM or 32 Kb/s APCM (Adaptive PCM) has been employed as a basic transmission path for digital transmission of voice signals. In this instance, coding of the voice signals at a low rate of 4.8 to 9.6 Kb/s without suffering appreciable deterioration of their quality would markedly improve the utilization efficiency of the basic transmission path and cut communication costs.

For economical construction of systems, which are severaly limited in terms of transmission frequency band, transmitting power and other transmission characteristics, such as a digital maritime satellite communication system, an air navigation satellite communication system, a digital business satellite communication system for business communications, and a digital mobile radio communication system for automobiles, there is a demand for a voice signal coding system which provides an excellent coded voice signal quality at a coding rate of about 4.8 to 9.6 Kb/s and is insusceptible to the influence of errors on the transmission path. The materialization of such a voice signal coding system will make it also possible to reduce a necessary storage capacity not only in the above-noted technical fields but also in a case where voice signals are stored in a coded form.

Hitherto, there has been proposed a residual Excited Linear Predicture coding system (hereinafter referred to as the "RELP system") as a typical coding system which employs the coding rate of 4.8 to 9.6 Kb/s.

The RELP system has its feature in that, by inputting an input voice signal into an inversed filter having a characteristic reverse from the correlation characteristic of the amplitude value of the input voice signal, a residual signal with a flattened short-time spectrum envelope is obtained and then the low-frequency component of the residual signal is transmitted after being coded into a waveform by PCM or adaptive delta modulation (ADM). On the receiving side, a high-frequency residual signal is regenerated by a non-linear reproducing method such as for rectification or a spectrum hold method of a spectrum folding principle, on the basis of the low-frequency residual signal obtained by waveform decoding. The low- and high-frequency residual signals are added together to restore the residual signal. The residual signal is applied as an exciting signal to a short-time spectrum synthesis filter, thereby reproducing a voice signal which has a spectrum envelope similar to that of the original voice signal.

In other words, the RELP system materializes the reduction of the coding rate by extracting the low-frequency component of the residual signal and transmitting it in the form of a waveform code.

By the way, for enhancement of the quality of the synthesized voice signal in the RELP system, it is important how faithfully the high-frequency components retaining the harmonic structure are reproduced on the synthesizing side. However, in the prior art which narrows the band of the low-frequency residual signal for decreasing the coding rate, as described above, the band of the high-frequency components to be reproduced broadens on the synthesizing side, and faithful reproduction of such high-frequency components is difficult, imposing a limitation on the enhancement of the voice signal quality.

As described above in detail, the defect of the conventional RELP system is atrributable to the basic arrangement which obtains a residual signal of a voice signal through inverse filtering, extracts therefrom a low-frequency residual signal, and transmits it after coding into a wave-form through the adaptive PCM (APCM) or adaptive delta modulation (ADM).

SUMMARY OF THE INVENTION

In view of the above-noted shortcoming of the prior art, an object of the present invention is to provide a transmission system with which it is possible to obtain a synthesized voice signal of excellent quality even if a low coding rate is employed.

To attain the above object, the transmission system of the present invention has its feature in that an input voice signal is predivided into low- and high-frequency residual signals, the low-frequency residual signal is transmitted in the form of waveform code with higher possible fidelity and lower possible quality deterioration through utilization of the Adaptive Predicture Coding (APC) system or Multi Pulse Excited Coding (MPEC) system, while information on the short-time high-frequency spectrum is extracted from the high-frequency residual signal and is transmitted as information for use in the reproduction of the voice signal on the receiving side.

BRIEF DESCRIPTION OF THE DRAWING

The present invention will be described in detail below in comparison with prior art with reference to the accompanying drawings, in which.

DETAILED DESCRIPTION

To make difference between prior art and the present clear, an example of prior art will first be described.

Figure 1A:
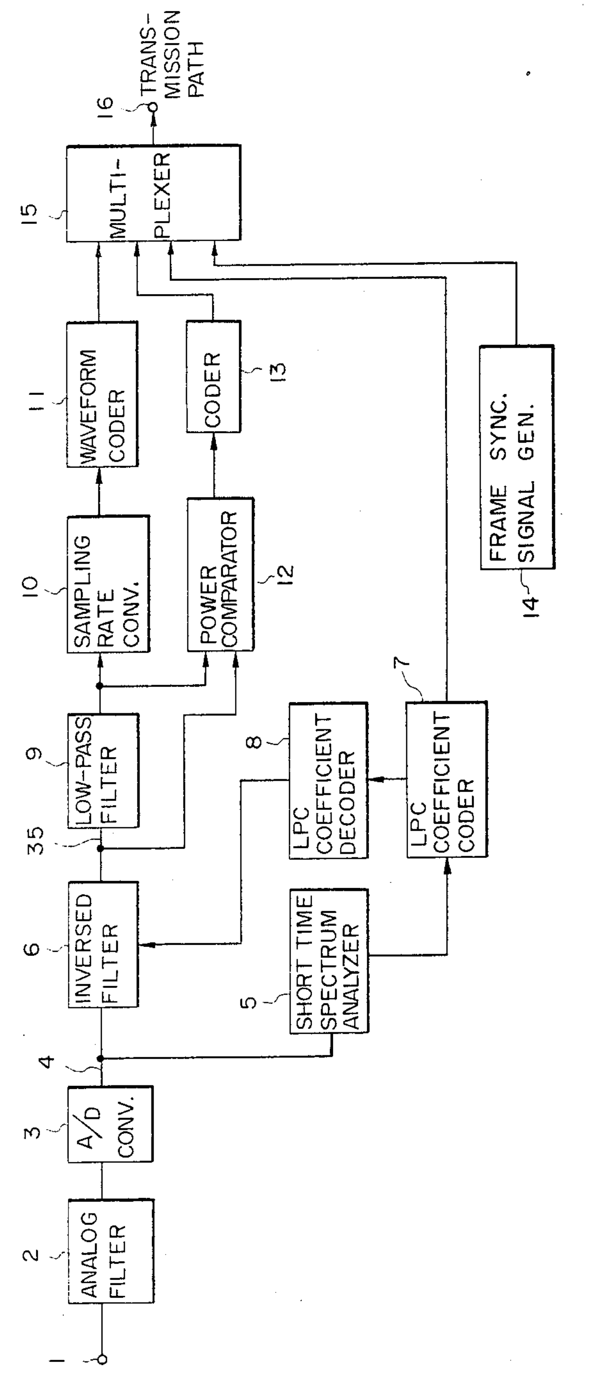
Fig. 1A PRIOR ART
FIGS. 1A, 1B and 2 are block diagrams showing an example of a conventional RELP system.

Now, a detailed description will be given of the prior art with reference to FIG. 1A which illustrates its specific example. An analog input voice signal to an input terminal 1 is band-limited by an analog filter 2 to 0.3 to 3.4 KHz, for instance, and is converted by an A/D converter 3 into a digital voice signal 4 sampled at, for example, 8 KHz. An inversed filter 6 is to eliminate the correlation of the amplitude of samples of the digital voice signal 4, thereby flattening its spectrum envelope. The filter coefficient established in the inversed filter 6 is obtained by analyzing in a short-time spectrum analyzer 5 the short-time spectrum envelope of the digital voice signal 4, for example, at each frame of 20 ms through an auto-correlation method or the like. The filter coefficient is coded by an LPC coefficient coder 7 for each frame and set in the inversed filter 6 via an LPC coefficient decoder 8 and, at the same time, it is transmitted to the receiving side, as described later. From the inversed filter 6 is provided a signal 35 with the flattened spectrum, which is called a residual signal. In order to transmit only the low-frequency component of the residual signal 35, the low-frequency residual signal is extracted by means of a low-pass filter 9 the pass-band of which ranges for instance, from 0 to 1,000 Hz. The sampling rate of this signal is converted by a sampling rate converter 10 in accordance with the band of the signal, from 8 KHz to 2 KHz in this example. The signal of such a low sampling rate is waveform-coded by a waveform coder 11. As mentioned above, the adaptive PCM (APCM) or adaptive delta modulation (ADM) is employed for this waveform coding.

Furthermore, in order to permit level adjustment in the reproduction of the high-frequency components of the residual signal on the receiving side, the transmitting side detects the power ratio between the residual signal 35 and the low-frequency residual signal by a power comparator 12, and codes it by a coder 13. The outputs from the waveform coder 11, the coder 13 and the coefficient coder 7 are provided to a multiplexer 15, wherein they are multiplexed along with a frame synchronization signal from a frame synchronization signal generator 14 at a required coding rate. The multiplexed output is provided on the transmission path via an output terminal 16.

Figure 1B:
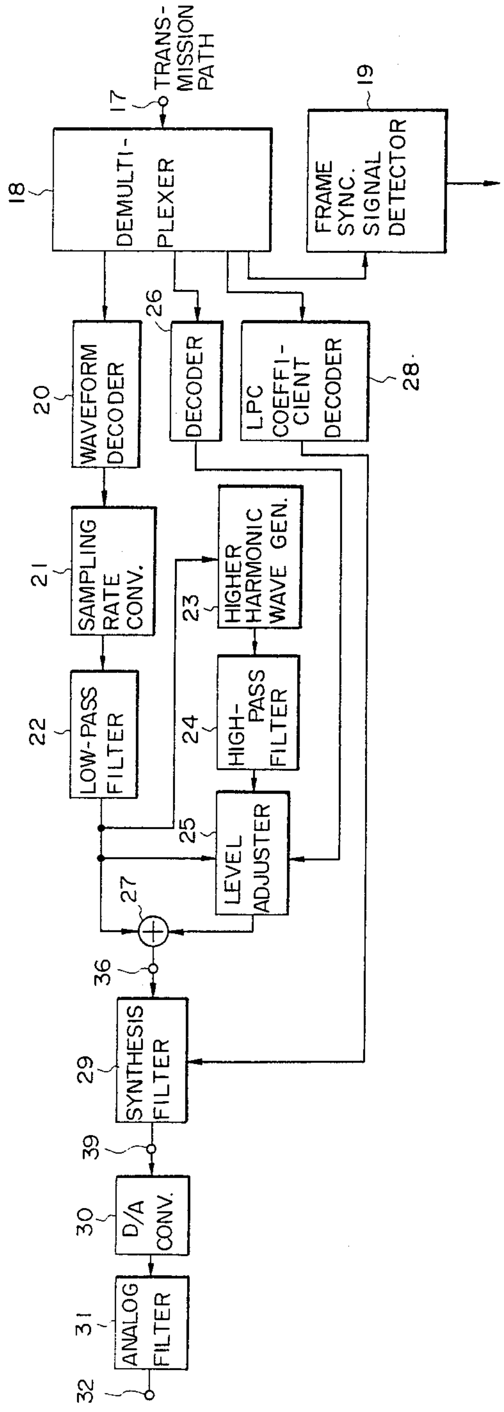
Fig. 1B PRIOR ART

Next, the operation of the receiving side will be described with reference to FIG. 1B.

The signal from the transmission path is applied via a terminal 17 to a demultiplexer 18, by which it is separated into the waveform-coded low-frequency residual signal, power-ratio information and filter-coefficient information of each frame in synchronism with the frame synchronization signal which is detected by a frame synchronization signal detector 19. The low-frequency residual signal, which is decoded by a waveform decoder 20, is rendered into a signal of an 8 KHz sampling rate through sample interpolatin by a sampling rate converter 21. The signal thus obtained is band-limited by a low-pass filter 22, reproducing the low-frequency residual signal. A higher harmonic wave generator 23 generates higher harmonic waves by a non-linear circuit or spectrum hold method on the basis of the low-frequency residual signal. The higher harmonic waves are applied to a high-pass filter 24 of, for example, a 1 to 4.0 KHz pass band, wherein it is rendered into a high-frequency residual signal. A level adjuster 25 is to adjust the level of the high-frequency residual signal so that its relation to the level of the low-frequency residual signal may become such as indicated by the power-ratio information which is provided from a decoder 26. After this, the high- and low-frequency residual signals are added together by an adder 27 into a residual signal of a 4 KHz band, which is applied as an exciting signal 36 to a spectrum synthesis filter 29 for the short-time spectrum. Since the filter coefficient obtained with an LPC coefficient decoder 28 is set in the synthesis filter 29, the exciting signal 36 is given a frequency characteristic, producing a digital voice signal 39. The signal 39 is applied to a D/A converter 30 and an analog filter 31, whereby it is provided as a band-limited analog voice signal at a terminal 32.

The above-described RELP system is basically defective for the transmission of signals at a low coding rate and for improvement of the quality of decoded voice signals. This defect will herein below be described in detail.

Figure 2:
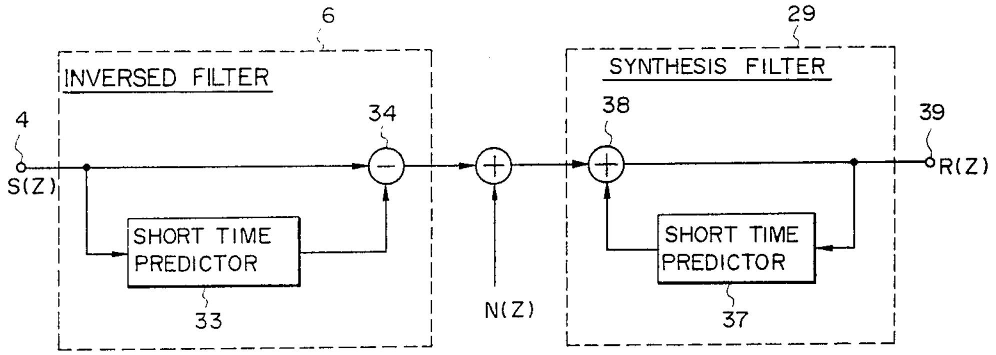
Fig. 2 PRIOR ART

According to the RELP system noted above, the basic arrangement for the low-frequency residual signal which is coded into a waveform is such as depicted in FIG. 2. That is, sampling rate converting means and coding/decoding means are provided between the inversed filter 6 and the synthesis filter 29, and a quantizing noise N(z) by the coding means is added to the low-frequency residual signal. The inversed filter 6 comprises a short-time predictor 33 and a subtractor 34, while the synthesis filter 29 comprises a short-time poredictor 37 of the same characteristic as that of the predictor 33 and an adder 38. Now, letting the transfer function of the predictor 37, expressed by Z conversion, and the low-frequency residual signal be represented by P(z) and S(z), respectively, the reproduced low-frequency residual signal R(z) can be expressed as follows:

$$R(z) = \frac{N(z)}{1 - P(z)} + S(z) \quad (1)$$

As is evident from Eq. (1), there is mixed in the reproduced low-frequency residual signal R(z) a quantizing noise component N(z) having passed through the synthesis filter 29. In addition, assuming that the quantizing noise component N(z) has a flat spectrum, the same spectrum envelope as that of the voice signal is produced, which results in serious deterioration of the subjective tone quality of the low-frequency residual signal. This is the same phenomenon as has often been pointed out in the waveform coding by an adaptive predicture coding system (hereinafter referred to as the "APC system". For this reason, it is customary, in the waveform coding by the conventional RELP system, to minimize the occurrence of the quantizing noise N(z) by the use of three or more quantizing bits and to narrow the band of the low-frequency residual signal for the purpose of reducing the coding rate.

For instance, according to a conventional 9.6 Kb/s RELP system, the low-frequency residual signal has a 1 KHz band and is sampled at a rate of 2 KHz, and one sample is quantized with four bits. The number of bits necessary therefor is 8K bits and the remaining 1.6K bits are used for the transmission for other information. In a 7.2 Kb/s RELP system, the low-frequency residual signal has a 0.8 KHz band and is sampled at 1.6 KHz, and one sample is quantized with three bits. The number of bits needed therefor is 4.8K bits and the remaining 3.4K bits are alloted for the transmission of other information. Further, in a 4.8 Kb/s RELP system, the band of the low-frequency signal cannot be made below 800 KHz in view of the distribution characteristic of the fundamental frequency of the voice signal, and the lower limit of the sampling frequency is 1.6 KHz at the lowest. On this account, the 3 bit quantization is impossible and the quality of the synthesized voice signal is impaired.

As a result of the above construction, the prior art has the afore-mentioned defects.

Figure 3:
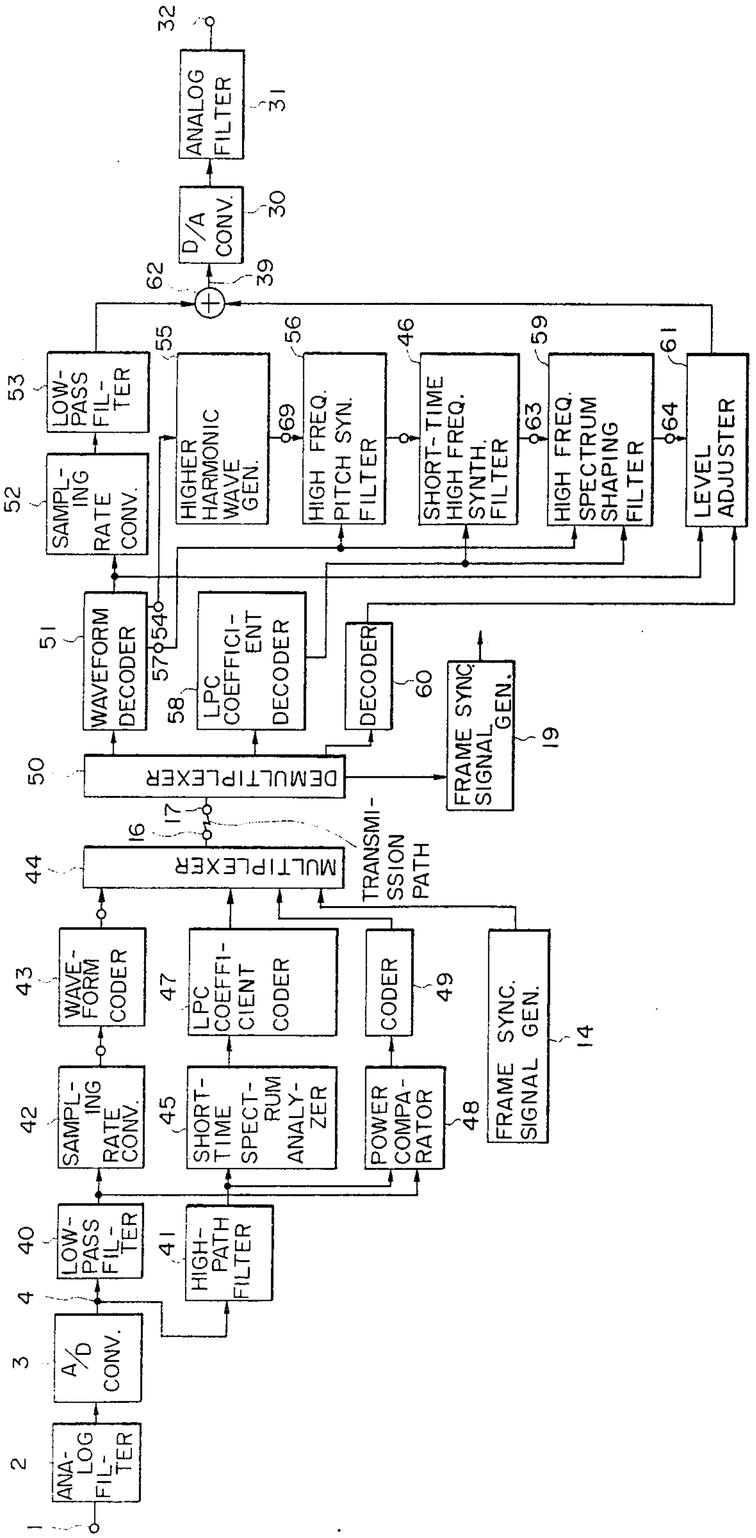
FIG. 3 is a block diagram illustrating an embodiment of the present invention.

Referring now to FIG. 3, an embodiment of the present invention will be described. The following description will be given on the assumption that the analog voice signal band is 4 KHz.

The analog voice signal from the input terminal 1 is subjected to band restriction by the analog filter 2, thereafter being converted by the A/D converter 3 into the digital signal 4 sampled at a rate of 8 KHz. The digital signal 4 is split into low- and high-frequency voice signals by means of low- and high-pass filters 40 and 41, respectively. The sampling rate of the low-frequency voice signal is converted by a sampling rate converter 42 from the 8 KHz sampling rate to a sampling rate twice higher than the frequency band of this signal, thereafter being faithfully coded by a waveform coder 43 into suitable waveform codes. On the other hand, the high-frequency voice signal is spectrum-analyzed by a short-time spectrum analyzer 45. Coefficient information obtained as the result of analysis is coded by an LPC coefficient coder 47. Moreover, the output powers from the low- and high-pass filters 40 and 41 are compared by a power comparator 48, and the result of comparison is coded, by a coder 49, as one of parameters for the reproduction of the high-frequency voice signal on the synthesizing side. The outputs from the waveform coder 43, the LPC coefficient coder 47 and the coder 49, described above, are multiplexed by a multiplexer 44, along with the frame synchronization signal from the frame synchronization signal generator 14, and the multiplexed output is provided on the transmission path via the terminal 14. Incidentally, the cut-off frequencies of the low- and high-pass filters 40 and 41 will be described later together with the characteristic of the waveform coder 43.

Next, the operation of the receiving and synthesizing side will be described.

The signal from the transmission path is provided via the terminal 17 to a demultiplexer 50, wherein it is separated into the frame synchronization signal, the coded low-frequency voice signal, the coded coefficient information, and the coded power ratio information. The coded low-frequency voice signal is decoded by a waveform decoder 51, interpolated by a sampling rate converter 52 to the sampling rate of 8 KHz, and then passed through a low-pass filter 53, whereby it is reproduced as the low-frequency voice signal. On the other hand, the high-frequency voice signal is reproduced in such a manner as follows: An exciting signal or a residual signal of a low-frequency spectrum synthesis filter in the waveform decoder 51, described later, is taken out from a terminal 54 for input into a higher harmonic wave generator 55. As higher harmonic wave generating means, any of conventional methods such as a rectification method, a spectrum fold method and a polarity pulse method can be employed, but higher harmonic wave generating means will be proposed later which is effective for improving the subjective evaluation value. A higher harmonic wave signal 69 generated by the higher harmonic wave generator 55 is derived from the low-frequency voice signal, and its harmonic structure and frequency characteristic cannot be regarded as faithfully reflecting those of the original voice signal. Therefore, the higher harmonic wave signal 69 is further subjected to the following processing. The signal is provided to a high-frequency pitch synthesis filter 56, wherein a spectral structure following the pitch period of the low-frequency voice signal is reproduced, and then a short-time high-frequency spectrum envelope is reproduced by a short-time high-frequency synthesis filter 46. The pitch period and filter coefficient of the high-frequency pitch synthesis filter 56 are obtained by taking out from a terminal 57 the pitch period and filter coefficient of a low-frequency pitch synthesis filter in the waveform decoder 51 and weighting them, as required, in consideration of the sampling rate of the low-frequency voice signal and the sampling rate of the higher harmonic wave signal. For instance, when the sampling rates of the low-frequency voice signal and the harmonic wave signal are of 2 and 8 KHz, respectively, a pitch period four times longer than that taken out of the waveform decoder 51 is set, and the filter coefficient is used as it is or as weighted value. The filter coefficient of the short-time high-frequency synthesis filter 46 is transmitted from the transmitting side and decoded by an LPC coefficient decoder 58. Incidentally, the parameter of the high-frequency pitch synthesis filter 56 may also be detected on the transmitting side and then transmitted therefrom to the receiving side when the transmission bit capacity is sufficiently large.

The output 63 from the short-time high-frequency spectrum synthesis filter 46 is further applied to a high-frequency spectrum shaping filter 59, wherein its spectrum is shaped so that the quality of the high-frequency voice signal to be repdoduced may be as close to the subjective quality of the original high-frequency voice signal as possible. As the filter coefficient in this instance, a value is used which is weighted on the filter coefficients employed for the high-frequency pitch synthesis filter 56 and the short-time high-frequency synthesis filter 46.

In this way, the higher harmonic wave signal 69 generated by the higher harmonic wave generator 55 is shaped by furnishing it with the pitch structure and the spectral structure of the original high-frequency voice signal, whereby the subjective evaluation of the reproduced high-frequency voice signal can markely be improved. Especially, in case of employing the spectrum fold method as the higher harmonic wave generating means, a single-frequency noise attributable to the fold period and called total noise, which has posed a problem in the past, can markedly be reduced.

The high-frequency voice signal thus reproduced is adjusted, by a level adjuster 61, in its power ratio to the low-frequency voice signal on the basis of the output information from a decoder 60. Then the high-frequency voice signal is applied to an adder 62, wherein it is added to the low-frequency voice signal to provide the digital voice signal 39 of 4 KHz band. The digital voice signal is provided to the D/A converter 30 and the analog filter 31, thereafter being output from the terminal 32.

Now, a description will be given of examples of the arrangements of the waveform coder 43 and the waveform decoder 51 for use in this embodiment, along with the relationship between the low-frequency voice signal band and the coding rate.

Figure 4A:
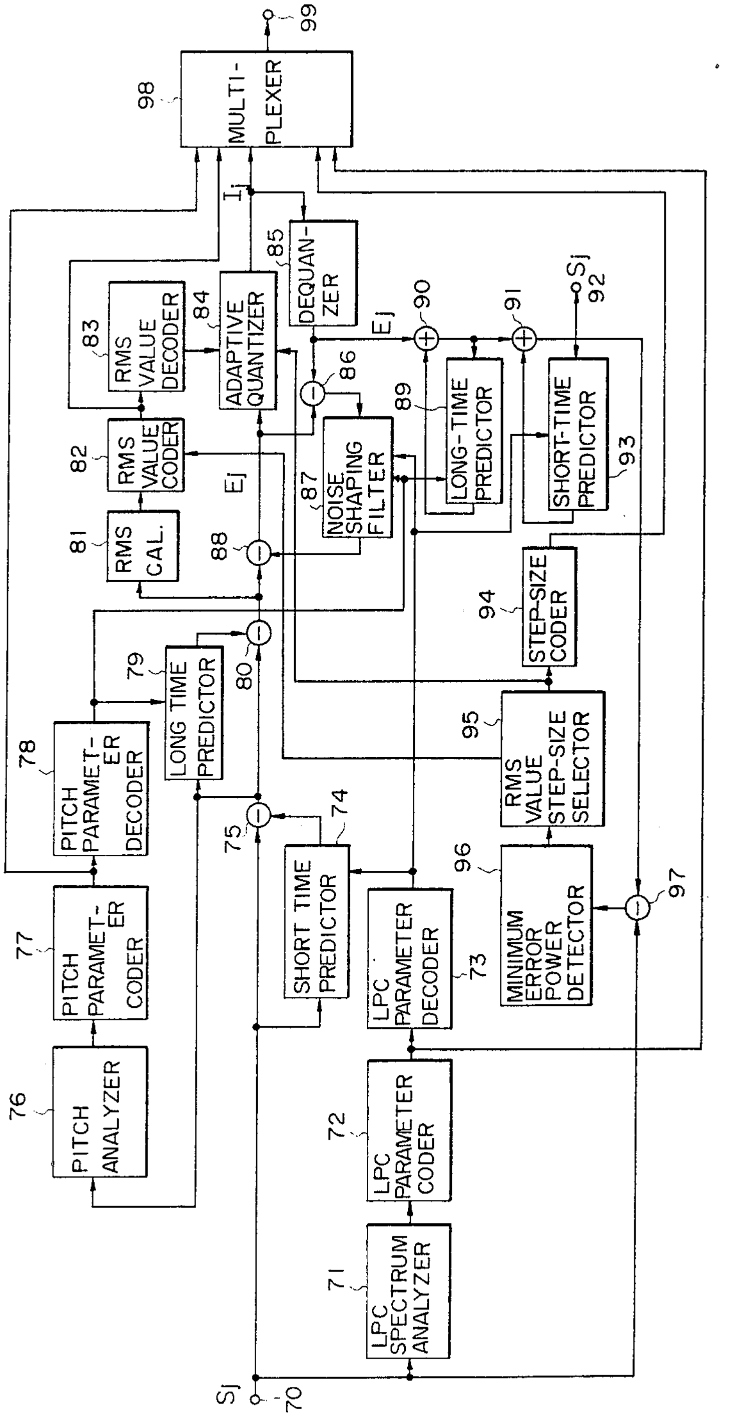
FIG. 4A is a block diagram showing a specific example of a waveform coder used in the embodiment of FIG. 3.
Figure 4B:
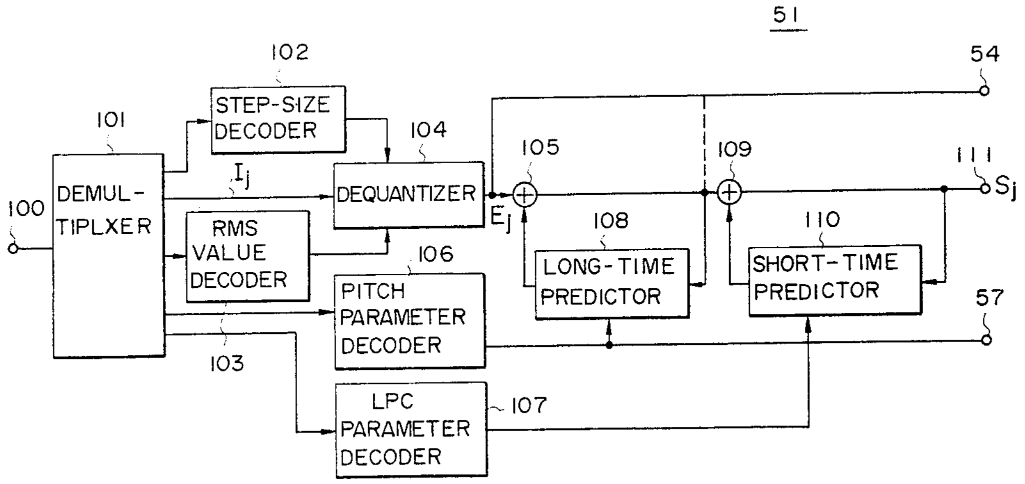
FIG. 4B is a block diagram showing an example of a waveform decoder for reproducing a signal transmitted according to the present invention.

FIGS. 4A and 4B illustrate examples of the arrangements of the waveform coder 43 and the waveform decoder 51. These examples employ the APC system and are disclosed in Japanese Patent Public Disclosure Gazette No. 116000/85.

The operation of the waveform coder 43 shown in FIG. 4A will be described first.

A digital input signal Sj is provided via a coder input terminal 70 to an LPC spectrum analyzer 71, wherein it is subjected to a short-time spectrum analysis (an LPC analysis) for each frame. The resulting LPC parameter is coded by an LPC parameter coder 72, thereafter being transmitting via a multiplexer 98 to the transmitting side.

Further, the output of the LPC parameter coder 72 is decoded by an LPC parameter decoder 73, obtaining a prediction coefficient. The prediction coefficient is weighted to different values for respective taps of a digital filter making up a short-time predictor 74, newly providing a prediction coefficient. Now, assume that the Z-converted transfer function of the short-time predictor 74 is as follows:

$$P(z) = \sum_{i=1}^{N} a_i Z^{-i}$$

where: $a_i = \alpha_i \beta^i$.

In the above, N is the number of taps, $a_i$ is a prediction coefficient of an i-th tap, $\alpha_i$ is a prediction coefficient obtained by decoding the result of the LPC analysis, and $\beta$ is a fixed constant representing the weighted value and has a value within the range of $0<\beta<1$. The prediction coefficient $a_i$ is used for a noise shaping filter 87 as well as for a short-time (spectrum) predictor 93 for local decoding. The prediction output from the short-time predictor 74, which employs the prediction coefficient $a_i$ (where i=1 to N), is subtracted by a subtractor 75 from the input signal, obtaining a short-time spectrum residual signal. The residual signal in this instance has no correlation in a short time other than the pitch period. Based on this signal, a pitch parameter coder 77 connected via a pitch analyzer 76 to the above-mentioned subtractor 75 obtains a correlation between the voice signal and the pitch period Np, computing a prediction coefficient for a long-time (spectrum) predictor 79. The long-time (spectrum) predictor 79 calculates a prediction value using the pitch period, the prediction coefficient, and the output signal from the subtractor 75, through utilization of a fact that the voice signal is repeated in substantially the same waveform corresponding to the pitch period. By subtracting the above short-time prediction value and the long-time prediction value from the input signal, the residual signal at the output noise of a subtractor 80 can be whitened substantially ideally. The pitch period and the prediction coefficient coded by the pitch parameter coder 77 are transmitted via the multiplexer 98 to the receiving side.

From the thus whitened output signal of the subtractor 80 is subtracted the output of the noise shaping filter 87 by a subtractor 88, the output of which is quantized as the final residual signal and encoded, by means of an adaptive quantizer 84. The adaptive quantizer 84 has, as its basic step size, a quantizing step size which provides an optimum value, that is, minimizes the quantizing noise when the variance of the final residual signal is one. Accordingly, when the variance of the final residual signal is not one, the quantizing characteristic will be deteriorated. It is an RMS calculator 81 that compensates for this deterioration. By multiplying the basic step size by the RMS value calculated in the RMS calculator 81, a quantizing step optimum to the RMS value can be obtained, and the final residual signal may also be controlled, by referring to the RMS value, so that the variance becomes one. It is desirable, for enhancement of the signal quality, to prepare a plurality of kinds of basic step sizes, taking into account the nature of the amplitude distribution of the final residual signal such as the Gausian or Laplacian distribution. However, the final residual signal at the output of the subtractor 88 has no ideal distribution because it is produced by subtracting from the whitened signal the output signal of the noise shaping filter 87 which has a frequency cutting-off characteristic. Therefore, a series of processing steps, described below, are needed for obtaining an optimum quantizing step size.

Now, let it be assumed that the quantizing step size is updated for each sub-frame.

The RMS value of the residual signal is obtained by the RMS value calculator 81 for each sub-frame, and it is further applied to an RMS value coder 82 and an RMS value decoder 83, obtaining a quantized RMS value. The output level of the RMS value coder 82 at this time is regarded as a reference level and stored in the coder 82, along the adjoining levels. At first, the step size of the adaptive quantizer 84 is determined, using as a reference RMS value a quantized RMS value corresponding to the reference level. Then the output of the noise shaping filter 87 is subtracted by the subtractor 88 from the residual signal, and the subtracted output is quantized as the final residual signal and enooded. Furthermore, the coded signal is provided to an adaptive dequantizer 85 to obtain a quantized final residual signal, from which is subtracted by a subtractor 86 the unquantized final residual signal, obtaining quantized noise. The quantized noise thus obtained is applied to the noise shaping filter 87. At the same time, the quantized final residual signal is provided to an adder 90, wherein it is added with the output from a long-time (spectrum) predictor 89 for local decoding. Moreover, the added output is added, by an adder 91 with the output from the short-time (spectrum) predictor 93 for local decoding. In consequence, a locally decoded input signal Sj is provided at a locally decoded signal terminal terminal 92. A difference between the locally decoded input signal and the input signal is obtained as an error signal by a subtractor 97. The power of the error signal is calculated in a minimum error power detector 96 over the sub-frame. For all the basic step sizes for each of which have been prepared a series of operations similar to those described above, the power of the error signal corresponding to each of them is calculated by the minimum error power detector 96 and stored therein. Furthermore, respective step sizes are obtained for all of a preditermined number of RMS levels near the reference RMS level, and they are set in the adaptive quantizer 84. As is the case with the basic step size, the aforementioned processing steps are performed, by which the error signal power for each RMS level is calculated and stored. That one of combinations of a predetermined reference and neighboring RMS values and the prepared basic step sizes which provide the minimum one of the error signal powers obtained corresponding to all the abovenoted combinations, is regarded as optimum quantizing parameters, which are coded by a step-size coder 94 and then transmitted via the multiplexer 98 to the receiving side. For the basic step size, a code word corresponding thereto is produced by the step-size coder 94 and transmitted via the multiplexer 98 to the receiving side.

Next, a description will be given, with reference to FIG. 4B, of the operation of the receiving side. The signal received via a decoder input terminal 100 is separated by a demultiplexer 101 into a signal concerning the final residual signal, a signal concerning the RMS value, a signal concerning the basic step size, and a signal concerning the pitch parameter. The RMS value is decoded by an RMS value decoder 103. This value and the basic step size obtained by a step-size decoder 102 are set in a dequantizer 104. Based on them, the signal Ij concerning the received final residual signal is decoded by the dequantizer 104, obtaining a quantized final residual signal Ej. On the other hand, the prediction coefficient obtained via an LPC parameter decoder 107 is set in a short-time predictor 110. The signal concerning the pitch parameter is applied to a pitch parameter decoder 106, by which the pitch period and the prediction coefficient are obtained, and they are set in a long-time predictor 108. The prediction output from the long-time predictor 108 is added, by an adder 105, to the output from the dequantizer 104, and the added output is provided to the long-time predictor 108. At the same time, the added output is added to the prediction output from the short-time predictor 110 by means of an adder 109, thereby obtaining a decoded voice band signal Sj.

Incidentally, the final residual signal Ej or the output signal from the adder 105 is output as a high frequency generating signal to a terminal 54. The output from the pitch parameter decoder 106 is provided at a terminal 57.

Figure 5:
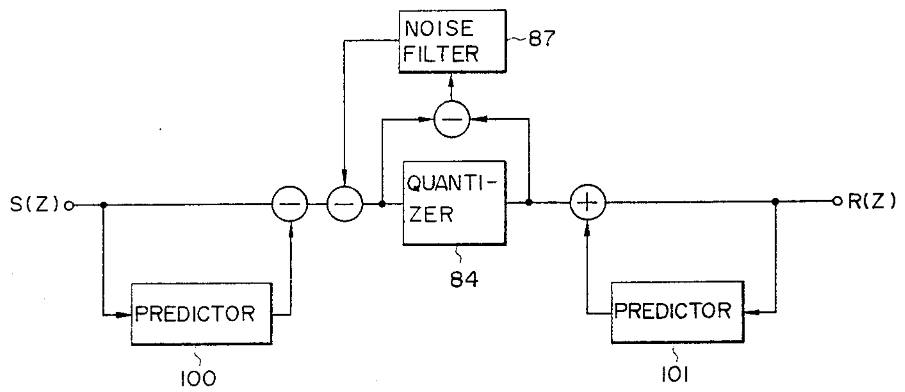
FIG. 5 is a diagram explanatory of the principles of the present invention.

The basic arrangement for the low-frequency voice signal in the embodiment of FIG. 3 employing the above-described APC system for the transmission of the low-frequency voice signal is such as illustrated in FIG. 5. In this case, a description will be given only in conjunction with a case of using short-time predictors. Reference numeral 100 indicated a short-time predictor on the transmitting side and 101 a short-time predictor on the receiving side. In this instance, letting the transfer function of the predictor 101, the transfer function of the noise shaping filter 87 in the waveform coder 43, the low-frequency voice signal, and the quantizing noise be represented by P(z), F(z), and N(z), respectively, the reproduced low-frequency voice signal R(z) can be expressed as follows:

$$R(z) = \frac{[1 - F(z)]}{1 - P(z)} N(z) + S(z) \tag{2}$$

In Eq. (2), under a condition where $F(z)=P/(Z/\delta)$ and by making the value of $\delta$ smaller than one, the influence of the quantizing noise can markedly lessened auditorily, as compared with the case of Eq. (1) previously mentioned.

In an actual simulation, a reproduced voice signal of good quality could be obtained although a one-bit quantization was performed by the adaptive quantizer 84.

The capability of transmitting the low-frequency signal by the one-bit quantization will bring about the following advantages in the RELP system.

In an transmittion system of 4.8 Kb/s, the low-frequency voice signal band is 1 KHz and is sampled at a rate of 2 KHz, and transmission bits of 2 Kb/s are allotted for the transmission of the signal, while transmission bits of 2.8 Kb/s are allotted to the transmission of the other information, thereby permitting high quality voice signal transmission. The transmission rate of 4.8 Kb/s will be the lower limit for high quality voice signal transmission.

In a 7.2 or 9.6 Kb/s transmission system, the low-frequency voice signal band can be enlarged. For instance, in the 7.2 Kb/s transmission system, if transmission bits of 4 Kb/s are allotted to the transmission of the low-frequency voice signal and 3.2 Kb/s to the transmission of the other information, the low-frequency voice signal band can be extended to 2 KHz. This means that the band of the high-frequency voice signal to be reproduced on the receiving side is reduced to 2 KHz, and consequently the quality of the voice signal to be reproduced can significantly be improved.

In the 9.6 Kb/s transmision system, transmission bits of about 7 Kb/s are allotted to the transmission of the low-frequency voice signal, the low-frequency voice signal band in this case is 3.5 KHz, and the band of the high-frequency voice signal to be reproduced on the receiving side is less than 1 KHz. Accordingly, even if the high-frequency voice signal reproducing means is not so high in performance, an extremely high quality voice signal can be obtained.

For the reasons given above, the cut-off frequencies of the low-pass filter 40 and the high-pass filter 41 are determined in relation to the coding rate.

Next, the higher harmonic wave generating means will be described in detail. In this embodiment, the conventional higher harmonic wave generating means can be employed as described previously, but a proposal will be made on means suitable for further enhancement of the signal quality.

Figure 6:
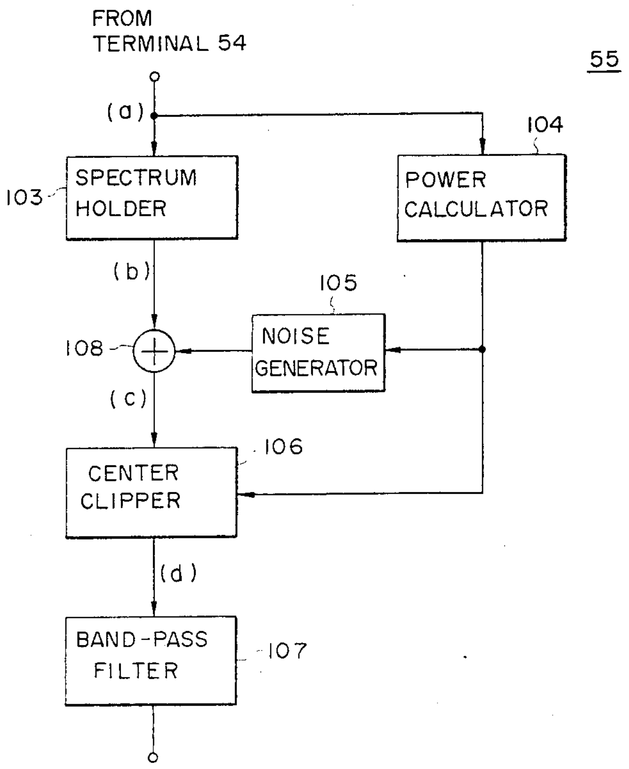
FIGS. 6, 7A, 7B, 7C and 7D are a block diagram showing higher harmonic wave generating means for reproducing a received signal transmitted in accordance with the present invention and time charts explanatory of its operation.
Figure 7A:
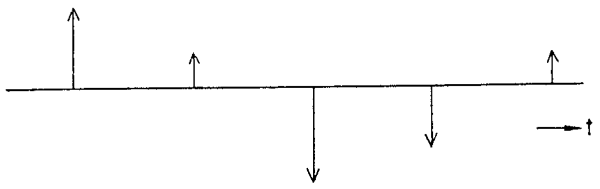
Figure 7B:
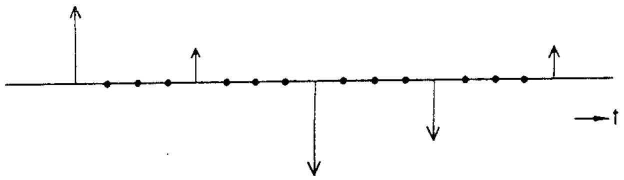
Figure 7C:
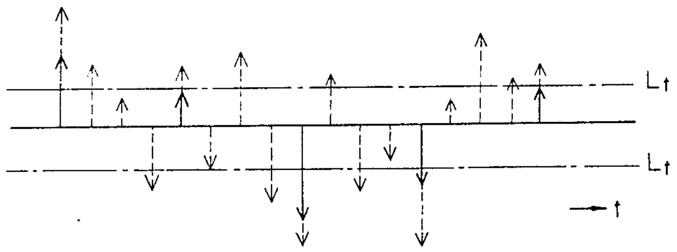

FIG. 6 illustrates an example of the arrangement therefor and FIGS. 7A to 7D show waveforms which occur at respective parts thereof. In this example, the input signal is a low-frequency voice signal sampled at 2 KHz, as shown in FIG. 7A. A spectrum holder 103 interpolates zero sample values between samples of the signal depicted in FIG. 7A, obtaining an 8 KHz-sampled signal such as shown in FIG. 7B. Viewed on the frequency axis, this signal has the low-frequency voice signal band repeatedly folded, which causes tonal noise. To prevent this, this example adds, by an adder 108, the waveform of FIG. 7B with a pseudo-noise which is produced by a noise generator 105. It is also possible to replace the zero sample values with pseudo-noises by some other means. since the pseudo-noise level must be proportional to the input signal level, the noise level is controlled by a power calculator 104. In FIG. 7C, the input signal is indicated by solid lines and the added pseudo-noise by broken lines. A center clipper 106 center-clips the signal of FIG. 7C at a level Lt indicated by one-dot chain lines. The reason for this is that samples of small values will cause unnecessary high-frequency noises.

Figure 7D:
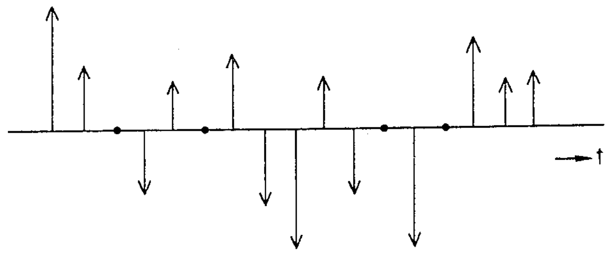

The clipping level Lt is also placed under control of the power calculator 105 since it needs to adaptively vary with the input signal level. As a result of this, the higher harmonic wave signal available from the center clipper 106 is such as shown in FIG. 7D. This signal is one that retains the harmonic wave structure but is suppressed in the tonal noise peculiar to the spectrum hold technique and has a flat spectrum. A band-pass filter 107 is employed to extract a required band.

The higher harmonic wave signal thus obtained is synthesized as a high-frequency drive voice signal source, using the pitch information and spectrum information, as noted previously, and its spectrum is further shaped, by which a high-frequency voice signal of high quality can be generated.

Figure 8:
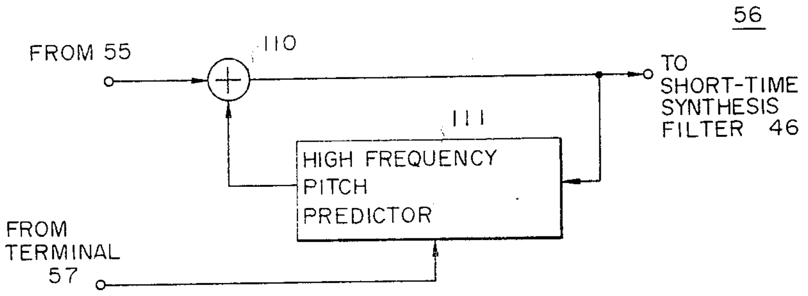
FIGS. 8, 9 and 10 are block diagrams showing specific examples of a high-frequency pitch synthesis filter, a short-time high-frequency synthesis filter, and a high-frequency spectrum shaping filter which are employed reproducing a received signal transmitted in accordance with the present invention.
Figure 9:
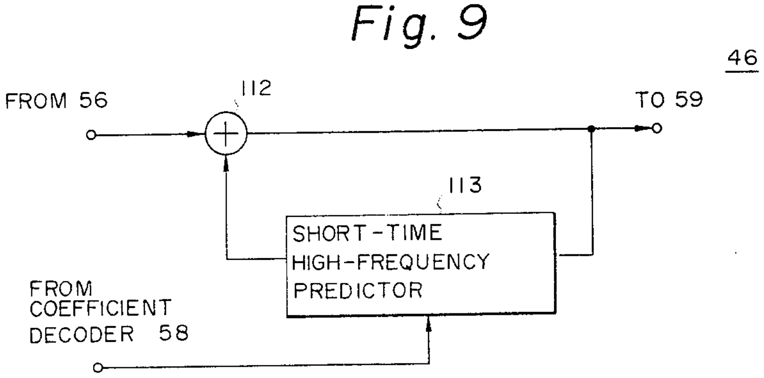
Figure 10:
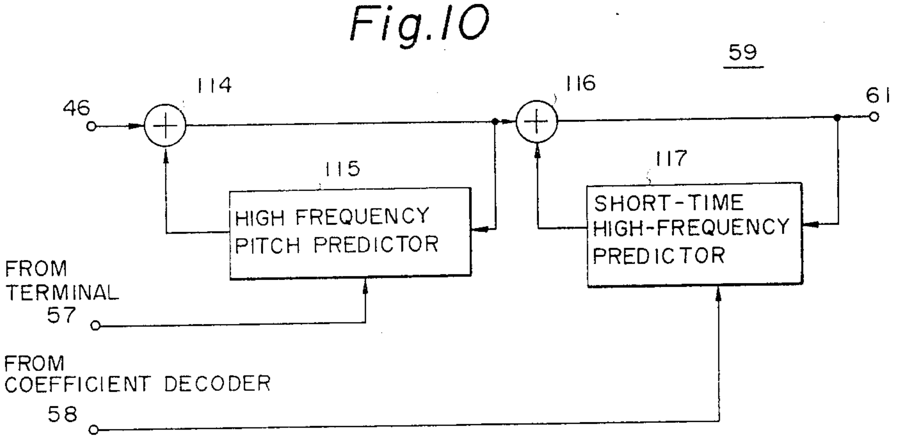

FIGS. 8 through 10 respectively illustrate, by way of example, the arrangements of the high-frequency pitch synthesis filter 56, the short-time high-frequency synthesis filter 46 and the high-frequency spectrum shaping filter 59 employed in the embodiment of FIG. 3. Incidentally, predictors 115 and 117 in FIG. 10 utilize the coefficients of the corresponding predictors 111 and 113 in FIGS. 8 and 9 or their adequately weighted values.

The above has described that the embodiment illustrated in FIG. 3 permits the reproduction of a voice signal more faithful to the original voice signal. However, the human auditory sense does not evaluate the quality of the voice signal in terms of the fidelity of its waveform alone. Sometimes the subjective evaluation value of the voice signal is decreased owing to the property of noise which is included therein.

The following will propose means effective for improving the subjective evaluation value though impairing the fidelity of the waveform to some extent. This means is effective for all voice signal transmission systems such as the conventional RELP system, APC system and so forth, regardless of the embodiment depicted in FIG. 3.

In case of waveform coding as in the APC system, the noise included in the reproduced voice signal is the quantizing noise N(z) which has a relatively flat spectrum relative to the frequency. In case of reproducing the higher harmonic waves as in the RELP system, the noise has a spectrum entirely different from that of the voice signal. Such a difference in the nature of the spectrum between the voice signal and the noise seriously impairs the subjective evaluation value. In view of this, the present invention emphasizes that nature of the voice signal and imparts to the noise a nature similar to that of the voice signal, thereby providing for enhanced evaluation in the auditory sense.

Figure 11:
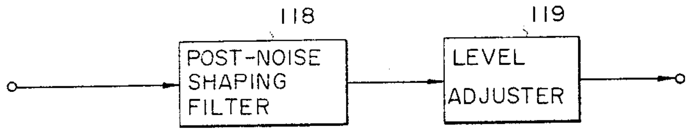
FIGS. 11, 12 and 13A and 13B are block diagrams and a characteristic diagram explanatory of means and its operation for improving the reproduced characteristics of the signal transmitted in accordance with the present invention.

FIG. 11 illustrates an example of the arrangement therefor, which comprises a post-noise shaping filter 118 and a level adjuster 119. In the embodiment of FIG. 1, these elements are connected between the synthesis filter 29 and the D/A converter 30, by which the reproduced voice signal is processed. The post-noise shaping filter 118 is identical in construction with the synthesis filter 29 and uses, as its coefficient, a weighted value of the coefficient of the synthesis filter 29.

Figure 12:
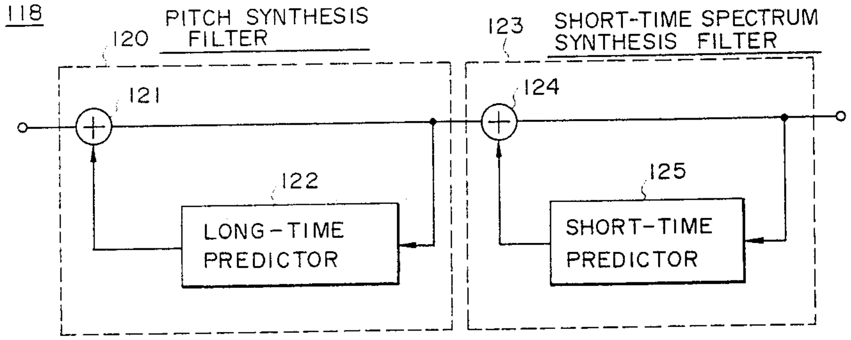

In the embodiment dpiected in FIG. 3, the post-noise shaping filter 118 and the level adjuster 119 are connected to the output of the waveform decoder 51. The post-noise shaping filter 118 is composed of a pitch synthesis filter 120 and a short-time spectrum synthesis filter 123, as shown in FIG. 12. A long-time predictor 122 and a short-time predictor 125 provided in these filters are identical in construction with the long-time predictor 108 and the short-time predictor 110 referred to previously in conjunction with FIG. 4B, and their coefficients are weighted values of the coefficients of the latter.

Figure 13A:
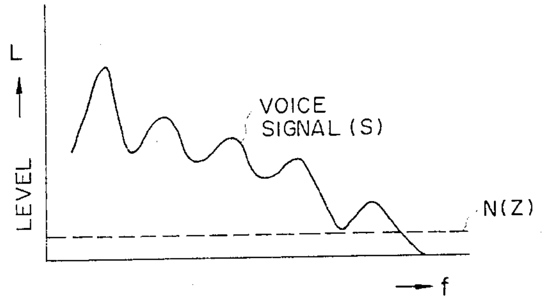
Figure 13B:
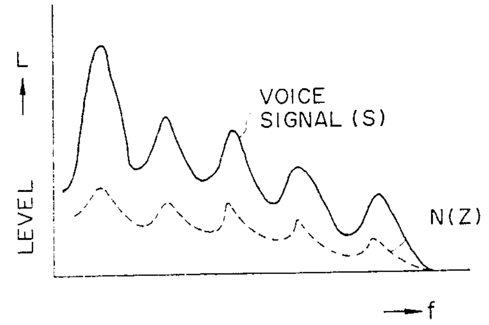

Letting the transfer functions of the long-time and short-time predictors 122 and 125 in the Z-conversion region be represented by $P_{PNL}(z)$ and $P_{PNS}(z)$, respectively, they can be expressed as follows:

$$P_{PNL}(z) = \gamma_L \cdot C \cdot Z^{-NP} \tag{3}$$

$$P_{PNS}(z) = \sum_{i=1}^{N} a_i \cdot \gamma_S^i \cdot Z^{-1}$$

where $\gamma_L$ and $\gamma_S$ are coefficients for shaping use, C is the coefficient of the long-time predictor 122, $N_P$ is the number of taps (corresponding to the pitch period) of the long-time predictor 122, $\alpha_i$ is the coefficient of an i-th tap of the short-time predictor 125, and N is the number of taps of the short-time predictor 125. In Eq. (3), if the coefficients $\gamma_L$ and $\gamma_S$ are each set to one, then the transfer functions of the long-time ans short-time predictors 73 and 74 in FIG. 4 will become equal to each other. Accordingly, though not shown in FIG. 12, the coefficients of the predictors 122 and 125 are supplied from the predictors 108 and 110 in the waveform decoder 51, and their coefficients are employed after being weighted by $\gamma_L$ and $\gamma_S$. The values of $\gamma_L$ and $\gamma_S$ are selected within the ranges of $0<\gamma_L$ and $\gamma_S \leqq 1$ on the basis of the subjective evaluation. Experimentally, good results were obtained under the values of the range of 0.4 to 0.2. By the operation of such a post-noise shaping filter 118 having an input shown in FIG. 13A, the feature of the voice signal is further emphasized while the noise shown in FIG. 13A is also given a characteristic similar to that of the voice signal, as shown in FIG. 13B.

The level adjuster 119 in FIG. 11 is provided for equally adjusting the input power and the signal power of the post-noise shaping filter 118 since the level of the signal varies therein.

As described above in detail, according to the present invention, the low-frequency voice signal is transmitted as a faithful waveform through utilization of the APC system and the high-frequency voice signal is transmitted as a prediction coefficient of a short-time spectrum. On the receiving side, the faithful low-frequency voice signal is decoded and the spectrum envelope and pitch structure are reconstructed for the reproduced higher harmonic waves, by which a high-frequency voice signal of high quality can be produced, and the voice signal quality can be markedly improved. Especially, the applicability of the APC system of one-bit quantization to the transmission of the low-frequency voice signal enables the voice signal transmission of good quality in the case of the coding rate of 4.8 Kb/s and the reduction of the high-frequency voice signal band in the case of the coding rate of 7.2 to 9.6 Kb/s, providing for enhanced voice signal quality.

Furthermore, the present invention offers means for generating a high quality higher harmonic wave and means for improving the subjective evaluation value of a voice signal.

What I claim is:

1. A system for transmitting a voice signal comprising means having filter means for dividing an input voice signal into a low-frequency voice signal and a high-frequency voice signal, means for developing a predictive residual signal of the low-frequency voice signal, a waveform coder for coding said predictive signal, a waveform coder for coding said predictive residual signal in order to minimize the deterioration of its quality, transmission means for transmitting the coded predictive residual signal, means for developing from the high-frequency voice signal information indicative of a short-time frequency spectrum thereof, coding means for coding the indicative information for transmission by said transmission means, said waveform coder comprising an adaptive quantizer for obtaining a coded low-frequency voice signal to be transmitted, a short-time predictor for obtaining a short-time prediction value from the low-frequency voice signal, a long-time predictor for obtaining a long-time prediction value from the low-frequency voice signal, first subtraction means for substracting the short-time prediction value and the long-time prediction value from the low-frequency voice signal to obtain a residual signal, a dequantizer for dequantizing the coded low-frequency voice signal to obtain a quantized final residual signal, saecond substraction means for substracting the quantized final residual signal from an input of the adaptive quantizer to obtain quantized noise, a noise shaping filter for obatining shaped noise, and third subtraction means for subtracting the shaped noise from the residual signal to obtain a final residual signal to be employed as the input of the adaptive quantizer.

2. A system for transmitting a voice signal according to claim, 1, in which said information indicative of the high-frequency voice signal is coefficient information and power ratio information, a short spectrum analyzer for obtaining said coefficient information from the high frequency voice signal, and said coding means comprising a coefficient coder, the power ratio information being obtained by comparing in a comparator the high-frequency voice signal with the low-frequency voice signal and coded by said coding means.

* * * * *